(12) United States Patent
Kris

(10) Patent No.: US 7,177,166 B1
(45) Date of Patent: Feb. 13, 2007

(54) PULSE WIDTH MODULATION FREQUENCY DITHERING IN A SWITCH MODE POWER SUPPLY

(75) Inventor: Bryan Kris, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 11/215,622

(22) Filed: Aug. 30, 2005

(51) Int. Cl.
*H02M 1/12* (2006.01)
*H02M 1/14* (2006.01)

(52) U.S. Cl. .................. 363/41; 323/282; 323/284; 323/286

(58) Field of Classification Search .................. 363/41; 323/282, 284, 286
See application file for complete search history.

(56) References Cited

U.S. PATENT DOCUMENTS

| | | | |
|---|---|---|---|
| 6,317,458 B1 | 11/2001 | Boggs et al. | |
| 6,366,070 B1* | 4/2002 | Cooke et al. | 323/284 |
| 6,400,232 B1* | 6/2002 | Good et al. | 331/143 |
| 6,414,858 B1* | 7/2002 | Giannopoulos | 363/41 |
| 6,504,351 B2* | 1/2003 | Eagar et al. | 323/282 |
| 7,023,253 B2* | 4/2006 | Huang et al. | 327/172 |

OTHER PUBLICATIONS

International Search Report for PCT/US2006/033317 Mailed Aug. 12, 2006.

* cited by examiner

*Primary Examiner*—Bao Q. Vu
(74) *Attorney, Agent, or Firm*—Baker Botts L.L.P.

(57) ABSTRACT

A switch mode power supply has pulse width modulation (PWM) frequency dithering of a PWM clock frequency. The PWM frequency dithering circuit may change the frequency of the PWM clock based upon each of a plurality of frequencies. A PWM time base circuit may comprise a period register containing a PWM period value, a comparator, and a PWM counter, wherein a PWM count value may be incremented in the PWM counter by the variable frequency PWM clock, the comparator may compare the PWM period value with the PWM count value and when the PWM period value and the PWM count value are substantially equal the PWM count value may be reset. The PWM frequency dithering circuit may comprise a roll counter, wherein the roll counter changes a roll count value each time the comparator resets the PWM count value in the PWM counter; a multiplexer having a plurality of inputs and an output, wherein the output is coupled to each one of the plurality of inputs of the multiplexer based upon the roll counter count value; and a plurality of frequency registers, each one of the plurality of frequency registers may be coupled to a respective one of the plurality of inputs of the multiplexer; wherein the output of the multiplexer may be coupled to a frequency control input of the variable frequency PWM clock such that frequency values stored in the plurality of frequency registers may be used in determining the variable frequency PWM clock frequency.

10 Claims, 2 Drawing Sheets

PULSE WIDTH MODULATION FREQUENCY DITHERING IN A SWITCH MODE POWER SUPPLY

TECHNICAL FIELD

The present disclosure, according to one embodiment, relates to switching regulator power supplies, and more particularly, to pulse width modulation frequency dithering in the switching regulator power supply.

BACKGROUND

Power supply manufacturers must meet government (e.g., Federal Communications Commission) and customer electromagnetic interference (EMI) emission requirements when selling switch mode power supplies. A switch mode power supply may use pulse width modulation (PWM) to control a switch, e.g., power transistor, power field effect transistor, etc., that may charge an inductor to a desired current. The longer the PWM signal is on, the longer the inductor is charging through the control switch and the more current that may be supplied from the switch mode power supply.

In the larger capacity switch mode power supplies, the power transistors generate electromagnetic interference (EMI). These larger capacity switch mode power supplies must be tested for and pass stringent EMI tests that limit the amount of radio frequency energy at a particular frequency for a certain length of time. If the switch mode power supplies cannot meet these EMI test requirements, they cannot be certified and/or type accepted by the appropriate testing organization and/or government agency.

SUMMARY

What is needed in a larger capacity switch mode power supply is some way to limit the amount of EMI energy generated at any particular frequency for longer than a desired time period.

According to a specific example embodiment of the present disclosure, a switch mode power supply having pulse width modulation (PWM) frequency dithering may comprise a power charging circuit having at least one power switching element, a PWM control circuit coupled to and controlling the power charging circuit, and a PWM frequency dithering circuit, wherein the PWM frequency dithering circuit may change a variable frequency PWM clock frequency to each of a plurality of frequencies. The PWM control circuit may have a PWM time base circuit comprising a period register containing a PWM period value, a comparator, and a PWM counter, wherein a PWM count value may be incremented in the PWM counter by the variable frequency PWM clock, the comparator may compare the PWM period value with the PWM count value and when the PWM period value and the PWM count value are substantially equal the PWM count value may be reset. The PWM frequency dithering circuit may comprise a roll counter, wherein the roll counter changes a roll count value each time the comparator resets the PWM count value in the PWM counter; a multiplexer having a plurality of inputs and an output, wherein the output is coupled to each one of the plurality of inputs of the multiplexer based upon the roll counter count value; and a plurality of frequency registers, each one of the plurality of frequency registers may be coupled to a respective one of the plurality of inputs of the multiplexer; wherein the output of the multiplexer may be coupled to a frequency control input of the variable frequency PWM clock such that frequency values stored in the plurality of frequency registers may be used in determining the variable frequency PWM clock frequency. The roll counter may increase the roll count value sequentially until at a maximum roll count value then the roll count value may reset to a minimum roll count value. The roll count value may also change randomly.

According to another specific example embodiment of the present disclosure, a pulse width modulation (PWM) frequency dithering apparatus for controlling a plurality of PWM clock frequencies, may comprise a roll counter, wherein the roll counter changes a roll count value each time a PWM count value is substantially equal to a PWM count value; a multiplexer having a plurality of inputs and an output, wherein the output is coupled to each one of the plurality of inputs of the multiplexer based upon the roll counter count value; and a plurality of frequency registers, each one of the plurality of frequency registers may be coupled to a respective one of the plurality of inputs of the multiplexer, wherein the output of the multiplexer may be coupled to a frequency control input of a variable frequency PWM clock such that frequency values stored in the plurality of frequency registers may be used in determining the variable frequency PWM clock frequency. The roll counter may increase the roll count value sequentially until at a maximum roll count value then the roll count value may be reset to a minimum roll count value. The roll count value may also change randomly.

According to yet another specific example embodiment of the present disclosure, a method for frequency dithering a pulse width modulation (PWM) clock frequency of a switch mode power supply may comprise incrementing a PWM count value for each frequency cycle of a PWM clock; comparing the PWM count value with a period value until the PWM count value is substantially the same as the period value then resetting the PWM count value; changing a roll count value each time the PWM count value is reset; selecting from a plurality of frequency values based upon the roll count value; and adjusting the frequency of the PWM clock based upon the selected one of the plurality of frequency values.

BRIEF DESCRIPTION OF THE DRAWINGS

A more complete understanding of the present disclosure thereof may be acquired by referring to the following description taken in conjunction with the accompanying drawings wherein.

Figure 1:
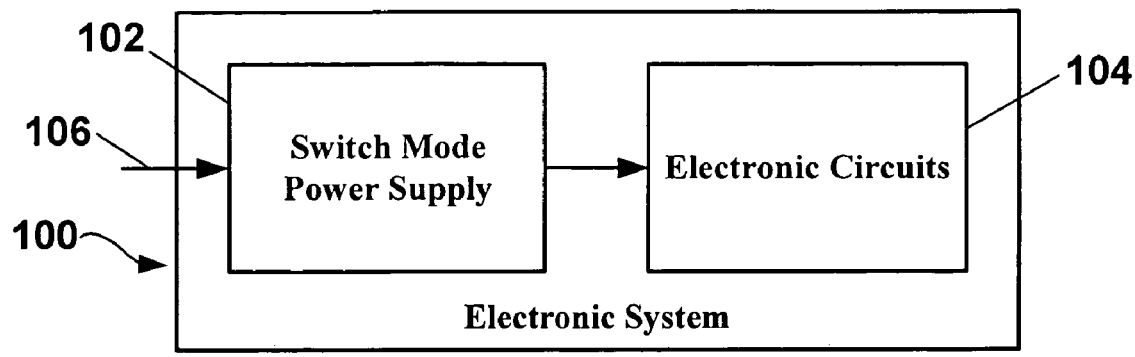
FIG. 1 is a schematic block diagram of an electronic system powered by a switch mode power supply.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

In switch mode power supplies, the power transistors may generate electromagnetic interference (EMI). Therefore, it is desirable to limit the EMI to meet customer needs and government regulations. Dithering the pulse width modulation PWM period sweeps the EMI over a range of frequencies thus lowering peak EMI emissions at any one frequency.

Referring now to the drawings, the details of example embodiments are schematically illustrated. Like elements in the drawings will be represented by like numbers, and similar elements will be represented by like numbers with a different lower case letter suffix.

Referring to FIG. 1, depicted is a schematic block diagram of an electronic system powered by a switch mode power supply. An electronic system, generally represented by the numeral 100, may comprise a power supply, e.g., switch mode power supply 102 that may supply operating voltages and currents to electronic circuits 104 of the electronic system 100. The switch mode power supply 102 may convert a power source voltage 106, e.g., 120 VAC, 48 VDC, etc., to all required operating voltages used by the electronic circuits 104.

Figure 2:
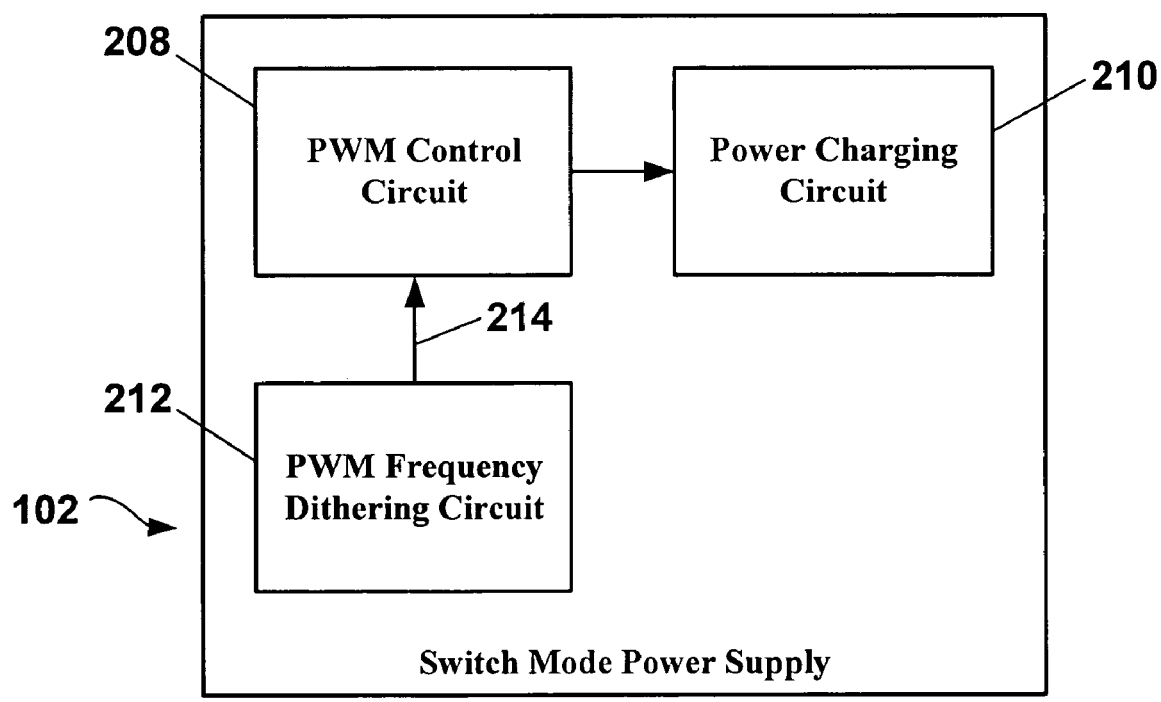
FIG. 2 is a schematic block diagram of switch mode power supply having a PWM frequency dithering circuit.

Referring to FIG. 2, depicted is a schematic block diagram of switch mode power supply having a PWM frequency dithering circuit. The switch mode power supply 102 may comprise a power charging circuit 210, a PWM control circuit 208, and a PWM frequency dithering circuit 212. The power charging circuit 210 may be controlled by the PWM control circuit 208. The PWM frequency dithering circuit 212 may vary a PWM clock frequency to the PWM control circuit 208. The power charging circuit may comprise at least one power switching element (not shown), e.g., power transistor, power field effect transistor, etc.

Figure 3:
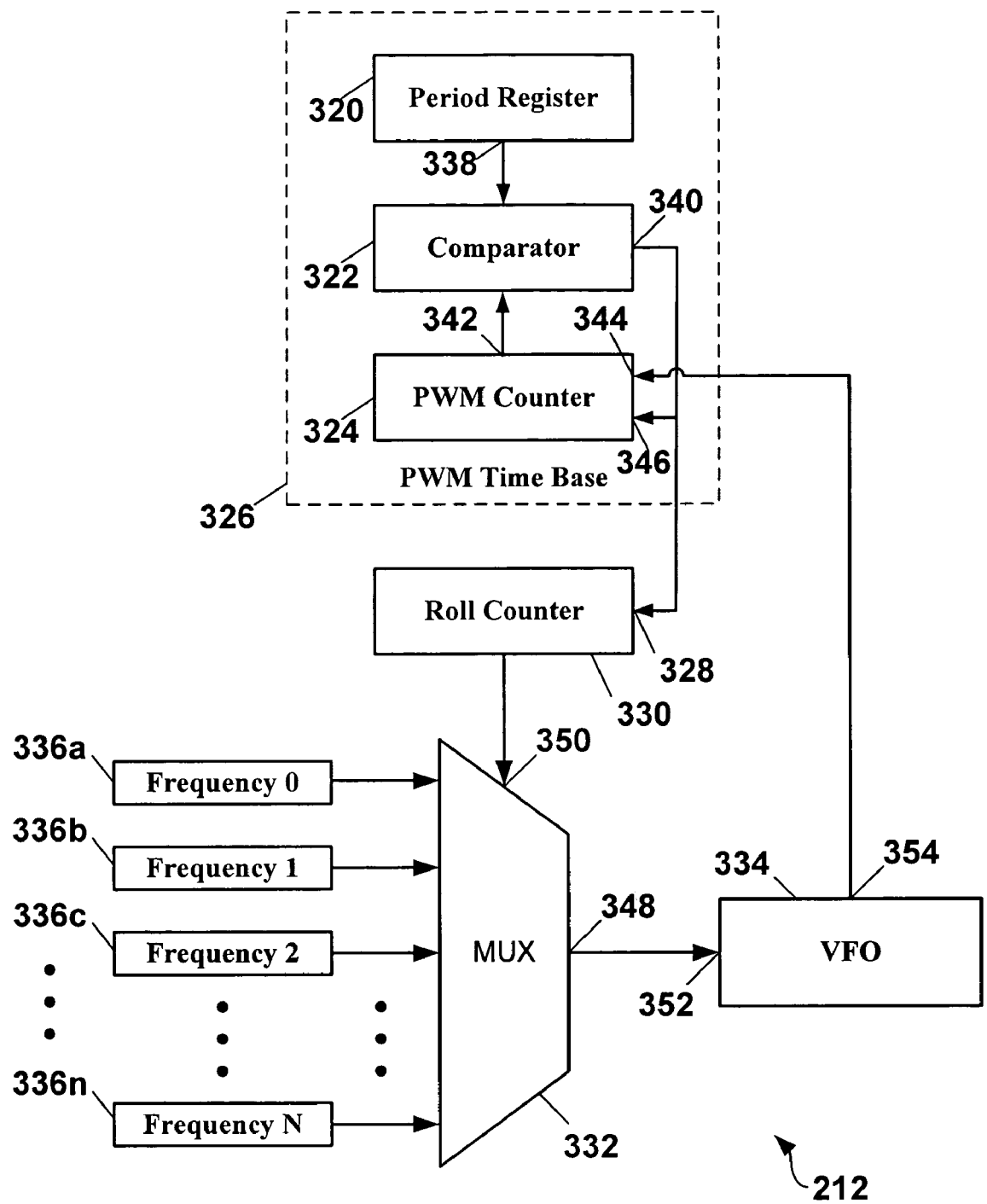
FIG. 3 is a more detailed schematic block diagram of the PWM frequency dithering circuit of FIG. 2, according to a specific example embodiment of the present disclosure.

Referring to FIG. 3, depicted is a schematic block diagram of a PWM frequency dithering circuit 212, according to a specific example embodiment of the present disclosure. The PWM frequency dithering circuit 212 may comprise a PWM time base circuit 326 having a period register 320, a comparator 322, and a PWM counter 324; a roll counter 330, a variable frequency oscillator (VFO) 334, a multiplexer 332 and a plurality of frequency registers 336 having frequency values stored therein. These frequency values may be user specified. Values at the period register 320 output 338 and the PWM counter 324 output 342 may be compared in the comparator 322, and when they are substantially equal the comparator 322 output 340 may cause (at reset input 346) the PWM counter 324 to reset, and may increment (at clock input 328) the roll counter 330. The comparator 322 compares the PWM time base counter 324 with a PWM period value that may be stored in the period register 320. The PWM period value may be user specified. When the PWM counter 324 reaches the specified maximum count value stored in the period register 320, the PWM period has been completed, and the PWM time base counter 324 is reset so the PWM cycle may start again.

The roll counter 330 may control which input of the multiplexer 332 is coupled to its output 348 as determined at the multiplexer select input 350. Depending upon the select value at the multiplexer select input 350, the frequency value stored in the selected one of the plurality of frequency registers 336 may be applied to the frequency adjustment input 352 of the VFO 334. The multiplexer 332 selects a desired frequency value from the plurality of frequency registers 336 that contain frequency values that may be specified by a user. The selected frequency value may control a timing element in the VFO 334, e.g., current source of an RC oscillator, divide-by-N phase-locked-loop (PLL), etc. The VFO 334 may then generate a PWM clock output 354 having a frequency corresponding substantially to the frequency value from the selected one of the plurality of frequency registers 336. The VFO 334 supplies this clock signal from the PWM clock output 354 to the PWM time base counter 324 of the PWM time base 326. The PWM clock output 354 may increment the PWM counter 324 through the clock input 344 of the PWM counter 324.

The roll counter 330 may be clocked (incremented) every time the PWM time base 326 reaches maximum (terminal) count. Therefore, at the end of each PWM cycle, the frequency of the PWM clock (VFO 334 output 354) is changed to a next one of the frequency values stored in the plurality of frequency registers 336. The roll counter 330 may also comprise a pseudo random number generator wherein the count value of the roll counter 330 may be randomly generated numbers within the bit range (number of bits) of the multiplexer select input 350 of the multiplexer 332.

As the frequency of the PWM clock (VFO 334 output 354) is varied, the radiated EMI energy from the switching power transistors (not shown) is spread over a range of frequencies. This reduces the time average EMI energy at any specific frequency, thus allowing EMI specifications to be more easily met.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A switch mode power supply having pulse width modulation (PWM) frequency dithering, comprising:
    a power charging circuit comprising at least one power switching element;
    a PWM control circuit coupled to and controlling the power charging circuit, wherein the PWM control circuit has a PWM time base circuit comprising:
        a period register containing a PWM period value;
        a comparator; and
        a PWM counter,
        wherein a PWM count value is incremented in the PWM counter by a variable frequency PWM clock,
        the comparator compares the PWM period value with the PWM count value and when the PWM period value and the PWM count value are substantially equal the PWM count value is reset; and
    a PWM frequency dithering circuit, wherein the PWM frequency dithering circuit changes the variable frequency PWM clock frequency to each of a plurality of frequencies.

2. The switch mode power supply according to claim 1, wherein the PWM frequency dithering circuit comprises:
    a roll counter, wherein the roll counter changes a roll count value each time the comparator resets the PWM count value in the PWM counter;
    a multiplexer having a plurality of inputs and an output, wherein the output is coupled to each one of the plurality of inputs of the multiplexer based upon the roll counter count value; and a plurality of frequency registers, each one of the plurality of frequency registers is coupled to a respective one of the plurality of inputs of the multiplexer;

wherein the output of the multiplexer is coupled to a frequency control input of the variable frequency PWM clock such that frequency values stored in the plurality of frequency registers are used in determining the variable frequency PWM clock frequency.

3. The switch mode power supply according to claim 2, wherein the roll counter increases the roll count value sequentially until at a maximum roll count value then the roll count value is reset to a minimum roll count value.

4. The switch mode power supply according to claim 2, wherein the roll count value changes randomly.

5. A pulse width modulation (PWM) frequency dithering apparatus for controlling a plurality of PWM clock frequencies, said PWM dithering apparatus comprising:

a roll counter, wherein the roll counter changes a roll count value each time a PWM count value is substantially equal to a PWM count value;

a multiplexer having a plurality of inputs and an output, wherein the output is coupled to each one of the plurality of inputs of the multiplexer based upon the roll counter count value; and a plurality of frequency registers, each one of the plurality of frequency registers is coupled to a respective one of the plurality of inputs of the multiplexer;

wherein the output of the multiplexer is coupled to a frequency control input of a variable frequency PWM clock such that frequency values stored in the plurality of frequency registers are used in determining the variable frequency PWM clock frequency.

6. The PWM frequency dithering apparatus according to claim 5, wherein the roll counter increases the roll count value sequentially until at a maximum roll count value then the roll count value is reset to a minimum roll count value.

7. The PWM frequency dithering apparatus according to claim 5, wherein the roll count value changes randomly.

8. A method for frequency dithering a pulse width modulation (PWM) clock frequency of a switch mode power supply, said method comprising:

incrementing a PWM count value for each frequency cycle of a PWM clock;

comparing the PWM count value with a period value until the PWM count value is substantially the same as the period value then resetting the PWM count value;

changing a roll count value each time the PWM count value is reset;

selecting from a plurality of frequency values based upon the roll count value; and adjusting the frequency of the PWM clock based upon the selected one of the plurality of frequency values.

9. The method according to claim 8, wherein the step of changing the roll count value comprises the step of sequentially incrementing the roll counter value until at a maximum roll count value then resetting the roll count value to a minimum roll count value.

10. The switch mode power supply according to claim 8, wherein the step of changing the roll count value comprises the step of randomly changing the roll count value.

* * * * *